March 28, 1950      F. L. RUPLEY      2,501,965
GAUGE HEAD FOR CYLINDRICAL BORES
Filed Dec. 7, 1946      2 Sheets-Sheet 1
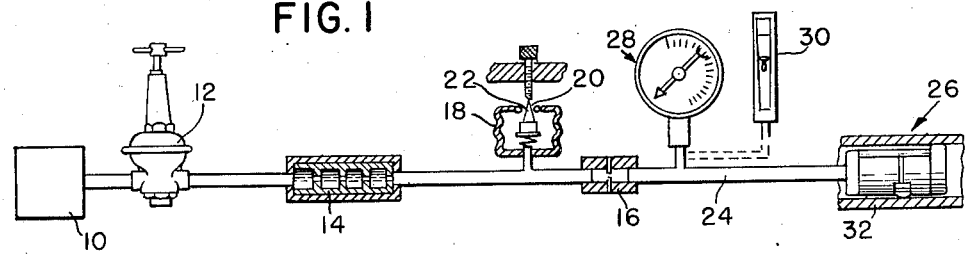
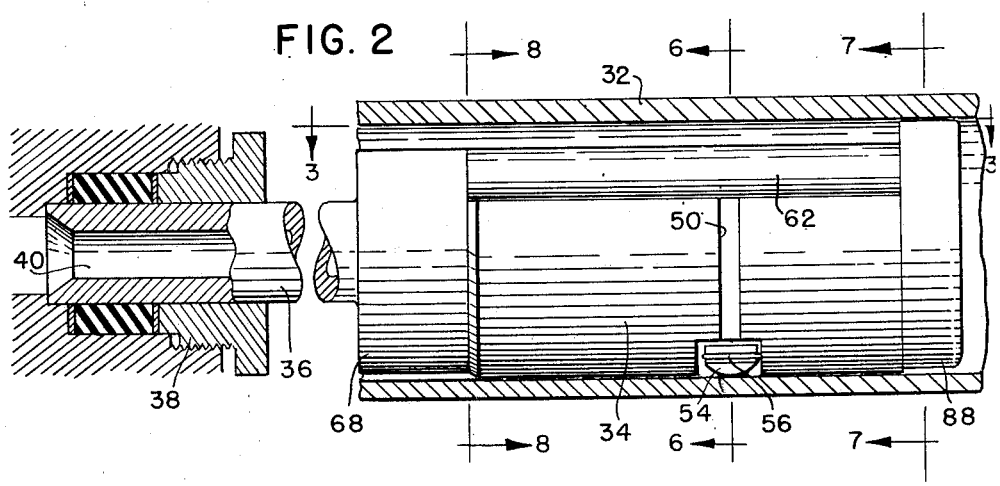
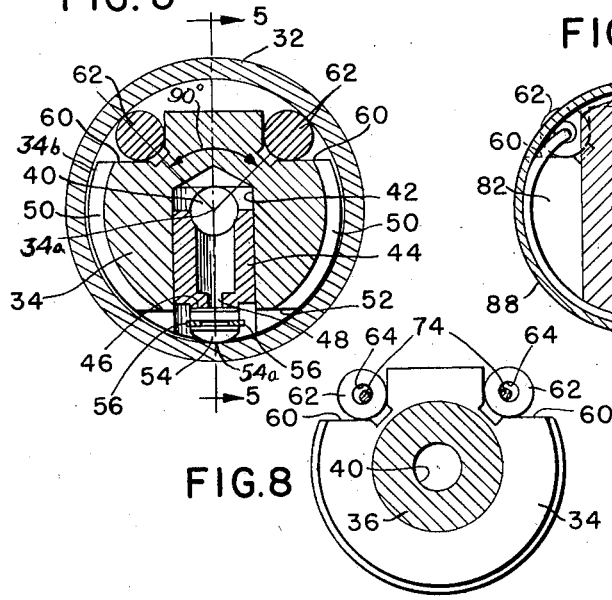
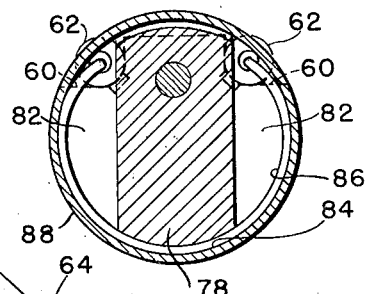
INVENTOR
FREDERICK L. RUPLEY
BY
Toulmin & Toulmin
ATTORNEYS March 28, 1950  F. L. RUPLEY  2,501,965
GAUGE HEAD FOR CYLINDRICAL BORES
Filed Dec. 7, 1946  2 Sheets-Sheet 2
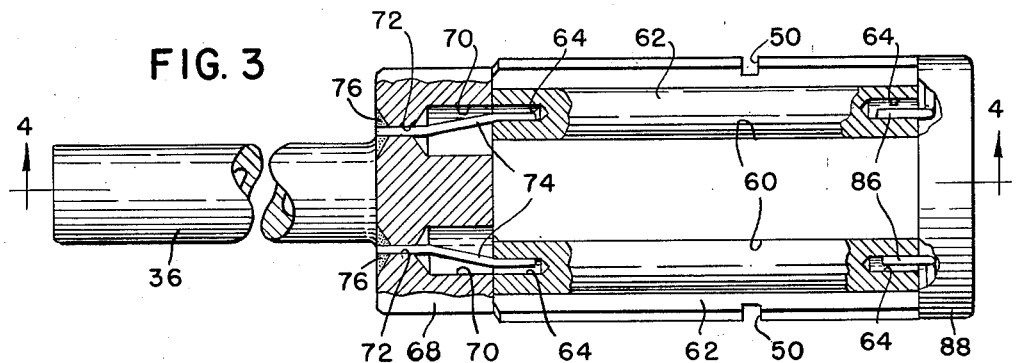
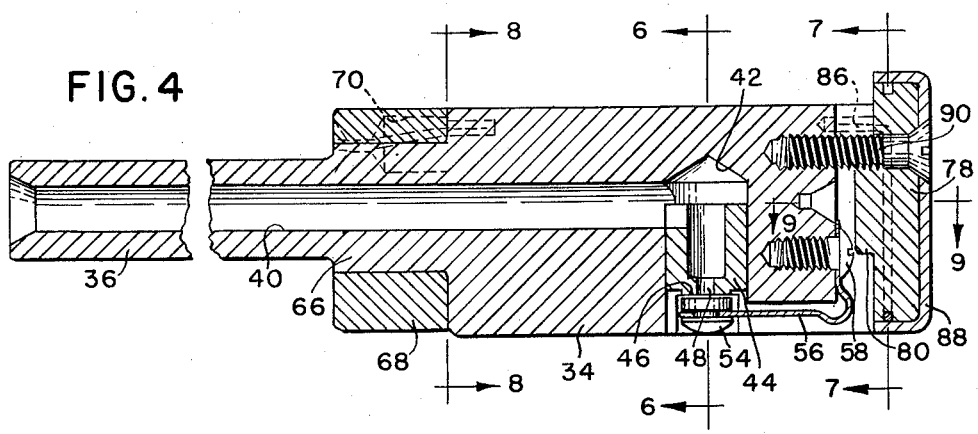
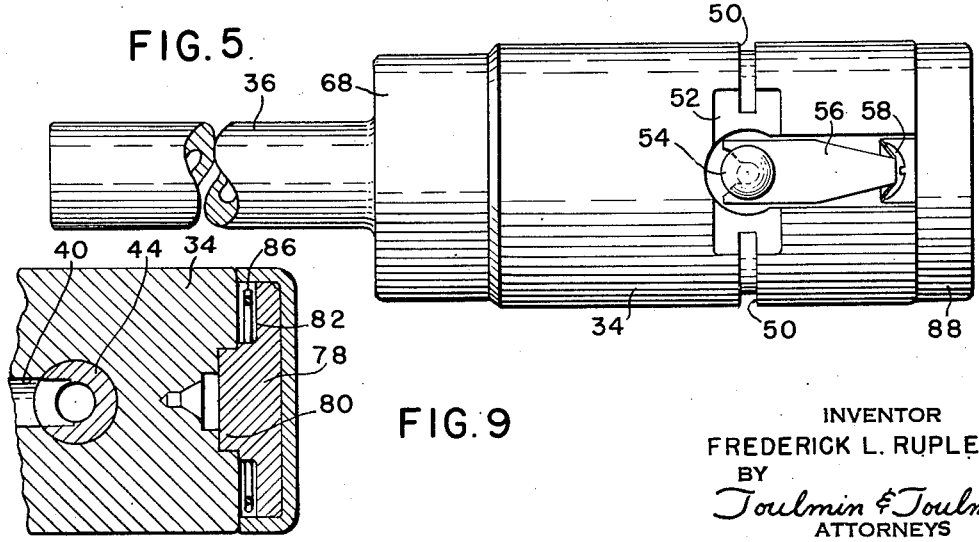
INVENTOR
FREDERICK L. RUPLEY
BY
Toulmin & Toulmin
ATTORNEYS Patented Mar. 28, 1950

2,501,965

UNITED STATES PATENT OFFICE 2,501,965

GAUGE HEAD FOR CYLINDRICAL BORES

Frederick L. Rupley, Cincinnati, Ohio, assignor to The Merz Engineering Company, Indianapolis, Ind., a corporation of Indiana Application December 7, 1946, Serial No. 714,801

2 Claims. (Cl. 33—178)

This invention relates to a gauging apparatus, and particularly to an improved type gauging head for gauging cylindrical bores.

In the gauging of cylindrical bores it is necessary that the gauging member and the workpiece be properly aligned in order to give a correct indication of the size of the bore. This is difficult with many gauging apparatuses wherein the cylindrical bore of a workpiece is engaged at points which are substantially coplanar. This permits the gauge head and workpiece to tilt relatively and in order to get a proper indication of the workpiece size the operator must manipulate the gauge head and workpiece relatively until the indication is at a minimum. In other instances, it may be desirable to determine whether or not the workpiece being gauged is straight, this often being necessary in the case of thin-walled tubes which have been machine worked to a predetermined inside diameter.

Accordingly, a particular object of the present invention is to provide an improved type gauge head for cylindrical workpieces which eliminates the above mentioned difficulties.

Still another object is the provision of an arbor type gauge head especially adapted for use in air gauging systems and being so constructed that a true indication of the diameter being measured is easily obtained.

A still further object is the provision of an arbor type air gauge head for cylindrical workpieces which is easily constructed and involves a minimum of finely machined parts.

It is also an object of this invention to provide an arbor type gauging head for cylindrical workpieces which can be adjusted within predetermined limits to accommodate for different sizes of workpieces.

These and other objects and advantages will become more apparent upon reference to the following description and the accompanying drawings in which:

Figure 1 is a diagrammatic view of a gauging set-up employing a gauge head according to this invention;

Figure 2 is an enlarged view of the gauge head end of the system of Figure 1;

Figure 3 is a plan view of the gauge head and may be indicated by the line 3—3 on Figure 2;

Figure 4 is a vertical longitudinal section through the gauge head and is indicated by the line 4—4 on Figure 3;

Figure 5 is a bottom plan view of the gauge head;

Figure 6 is a transverse sectional view indicated by the lines 6—6 on Figures 2 and 4;

Figure 7 is another transverse sectional view and is indicated by the lines 7—7 on Figures 2 and 4;

Figure 8 is still another transverse section indicated by the line 8—8 on Figures 2 and 4; and Figure 9 is a partial plan section indicated by the line 9—9 on Figure 4.

General arrangement

According to this invention a gauge head is provided for workpieces having cylindrical bores therein and comprises a substantially cylindrical mandrel or arbor 34 having movably supported on one side thereof a gauging member or button which is to be actuated relative to the arbor by engagement with the workpiece. The movable button is yieldably supported on the arbor and varies the flow of an expansible fluid through the arbor in accordance with the size of the workpiece being measured. This change in fluid flow is accurately indicated on an indicating instrument and the exact size of the workpiece is thereby determined.

On the opposite side of the arbor 34 from the gauging button are a pair of longitudinally extending rollers which bear against carefully machined flats on the arbor and are yieldably retained in position therein. The rollers are adapted for engagement with the work member with a line contact whereby the work member is accurately supported on the arbor. Means are provided for removing the rollers from the arbor and for replacing them with rollers of a different size whereby the arbor can be accommodated to workpieces of different size.

Structural arrangement

A gauging system in which the gauge head of this invention is adapted for use is diagrammatically illustrated in Figure 1 wherein there is indicated at 10 a source of fluid under pressure, this fluid preferably being compressed air. The fluid from the source 10 flows through a pressure regulator 12 and thence through a plurality of throttling orifices 14. The fluid emerging from the right side of the throttling orifices 14 is at a substantially constant pressure due to the action of the regulator 12 and the orifices 14 and is conducted to a fixed orifice 16 and a chamber 18.

The chamber 18 may comprise an expansible bellows having a port 20 discharging to atmosphere and which is adapted for being variably restricted by the adjustable valve member 22. It will be apparent that an increase in pressure within the bellows 18 will increase the discharge of fluid through the port 20, while a decrease in pressure will bring about a decrease in the said discharge. The bellows 18 and port 20, therefore, cooperate to maintain the fluid pressure at the inlet side of the fixed orifice 16 at a constant pressure under all conditions.

The orifice 16 has its discharge side connected by a conduit 24 with the gauge head 26 of this invention. Between the orifice and gauge head there is connected an indicating instrument which may comprise a pressure gauge as indicated at 28 or an instrument responsive to fluid flow as indicated at 30. When a workpiece 32 is placed on the arbor 34 of the gauge head 26 the instrument 28 or 30 will give an indication on the scale of the instrument as to the true size of the workpiece.

Referring to Figures 2 through 9, the gauge head will be seen to comprise an arbor or body portion 34 which is substantially cylindrical in shape having an axis 34a, Figure 6, and which has a reduced diameter projection 36 extending rearwardly therefrom which is adapted for being clamped by a gland 38 into a fitting or member which is in communication with the conduit 24.

The body or arbor 34 of the gauge head is hollow, having a passage 40 therethrough which is intersected by the transverse bore 42 within which is mounted the member 44. The member 44 has an accurately machined flat lower face thereon as at 46 and a port 48 opening through the said face. The body portion 34 in the plane of the member 44 is preferably grooved as at 50 and there is an enlarged groove or flat as at 52 extending across the bottom of the body so that fluid passing through the port 48 will have free access to the atmosphere.

Located in spaced relationship with the port 48 is a movable gauging member or button 54 which has an arcuate work engaging surface 54a projecting beyond the periphery 34b of the arbor 34 on the lower side thereof and an accurately machined flat surface on the opposite side thereof adapted for cooperation with the surface 46 in variably restricting the port 48. The member 54 has an annular groove therearound into which extends the bifurcated end portions of a spring 56 which is detachably mounted on the end of the body 34 as by the screw 58. In order to maintain the spring 56 and screw 58 within the limits of the body or arbor 34 the said body is preferably slotted longitudinally to receive the spring and transversely across the end portion for receiving the screw 58 and the bent-up end of the spring.

The side of the body opposite the movable gauging member is notched as best seen in Figures 6, 7 and 8. These notches, of which there are two, are indicated at 60 and comprise accurately finished vertical and horizontal surfaces extending longitudinally of the body 34 and spaced peripherally 90° apart on the surface 34b on the body or arbor 34. In each of the notches 60 there rests an accurately finished roller 62 which rests on the aforementioned horizontal and vertical surface of the notches with their cylindrical surfaces projecting beyond the peripheral surface 34b of the arbor 34.

As best seen in Figure 3, the rollers 62 are drilled from either end thereof as at 64 for receiving the ends of retaining members which maintain the said rollers continuously in engagement with the notches 60.

In Figures 3 and 4 it will be observed that between the portion 34 and the reduced diameter shank portion 36 there is an intermediate portion 66 which receives a collar 68.

Preferably, the collar is a press fit on the portion 66 but may be rigidly retained thereon by any other suitable means. The collar has a pair of counterbores 70 therein which are adjacent the ends of the rollers 62 and which are drilled through at their bottoms by the smaller bores 72. Within each of the bores 72 there is mounted a spring member 74 which is retained rigidly in place as by the soldering or brazing indicated at 76.

The spring members 74 extend through the counterbores 70 and have their ends receivable loosely in the drilled holes 64 of the members 60. The springs 74, as will be noted in Figures 3 and 4, are flexed to engage the said rollers thereby continuously to urge the same into the notches 60.

At the forward end of the gauge head there is a block 78 which, as seen in Figure 9, has a tongue 80 thereon which engages the transverse notch in the end of the body. The block 78 is notched at either side as may be seen at 82 in Figures 7 and 9 and across its lower portion has a groove 84. Within the groove 84 and extending through the notches 82 is a circular spring member 86 which has its end portions turned at substantially 90° into engagement with the drilled holes 64 in the forward end of the rollers 62. The spring member 86 is normally curved to a greater degree than is shown in Figure 7 and, therefore, must be flexed outwardly to engage the rollers. Thus, as in the case of the spring member 74, the spring 86 is operable to maintain the rollers in firm engagement with the notches 60.

There is provided a cup-shaped cover member 88 which extends over the block 78 and retains the spring 86 therein. The entire assembly of block, spring, and cup member 88 are mounted on the end of the gauge head by a screw 90 which extends into the body 34.

It will be observed that the rollers 62 can be removed from the gauging head at any time by removing the screw 90 and withdrawing the block 78 from its assembled position. The rollers can, therefore, be replaced if they become worn or warped, or another size of rollers can be placed on the body for the purpose of gauging workpieces of a different size.

*Operation*

In operation, a workpiece is passed over the gauge head into its Figure 1 and 2 position. The workpiece at this time rests on the rollers 62 with which it makes line contact, and actuates the movable gauging member 54 toward the surface 46 thereby to restrict the port 48. Restriction of the port 48 brings about a change of pressure in the conduit 24 which is indicated on one of the gauges 28, 30. Should it be desired to test the workpiece for out of round, it is only necessary that it be rotated in contact with the roller 62 on the arbor 34. If the indication of the indicating instrument varies more than a predetermined amount, then the workpiece may be rejected.

If the workpiece is to be tested for straightness, this may be accomplished either by the aforementioned rotation thereof on the gauge head, or by movement in an axial direction thereon. At the same time, movement in an axial direction may be employed for checking the relative sizes of different parts of the bore. Thus, it will be seen that the gauge head of the present invention will check a cylindrical bore in a workpiece for all of its critical characteristics such as straightness, roundness and consistency of size from end to end.

Furthermore, by replacing the rollers on the arbor, the gauge head can be adapted to workpieces of greater or lesser diameter, within the limits of adjustability of the gauge head and the same advantages will obtain.

It will be understood that this invention is susceptible to modification in order to adapt it to different usages and conditions and, accordingly, it is desired to comprehend such modifications within this invention as may fall within the scope of the appended claims.

I claim:

1. In a gauging head for gauging the inside dimensions of workpieces; an arbor receivable in said workpieces; spaced apart and longitudinally extending notches opening radially outward and circumferentially spaced 90° apart on one side of said arbor, the said notches having smoothly finished surfaces thereon; a roller in each of said notches and also having smoothly finished cylindrical surfaces thereon projecting beyond the periphery of said arbor; a gauging button having an arcuate workpiece engaging surface projecting beyond the periphery of said arbor and mounted for radial movement in a plane passing diametrically through the axis of said arbor and between said rollers, said button being located between the ends of said rollers; means responsive to movements of said button for indicating workpiece sizes; and means detachably retaining said rollers in said notches.

2. In a gauging head for gauging the inside dimensions of workpieces; an arbor receivable in said workpieces; spaced apart and longitudinally extending notches on one side of said arbor, the said notches having smoothly finished surfaces thereon; a pair of rollers receivable in said notches and also having smoothly finished surfaces thereon; a gauging button having an arcuate workpiece engaging surface yieldably carried on the side of said arbor opposite said rollers and between the ends thereof; means responsive to movements of said button for indicating workpiece sizes; and means detachably retaining said rollers in said notches, said means comprising spring means carried by said arbor and continuously urging said rollers against the surfaces of said notches.

FREDERICK L. RUPLEY.

REFERENCES CITED

The following references are of record in the file of this patent:

UNITED STATES PATENTS

| Number | Name | Date |
|---|---|---|
| 1,676,248 | Bryant | July 10, 1926 |
| 1,985,576 | Mennesson | Dec. 25, 1934 |
| 2,381,491 | Emmerton | Aug. 7, 1945 |